United States Patent
Haffley et al.

(10) Patent No.: US 9,884,331 B2
(45) Date of Patent: Feb. 6, 2018

(54) BELLOWS FLUID SEAL

(71) Applicant: Graco Minnesota Inc., Minneapolis, MN (US)

(72) Inventors: Parker J. Haffley, Hudson, WI (US); Matthew R. Theisen, Woodbury, MN (US); Paul R. Quam, Richland, WA (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/523,043

(22) PCT Filed: Oct. 29, 2015

(86) PCT No.: PCT/US2015/058003
§ 371 (c)(1),
(2) Date: Apr. 28, 2017

(87) PCT Pub. No.: WO2016/069870
PCT Pub. Date: May 6, 2016

(65) Prior Publication Data
US 2017/0333923 A1    Nov. 23, 2017

Related U.S. Application Data

(60) Provisional application No. 62/073,157, filed on Oct. 31, 2014.

(51) Int. Cl.
*B05B 1/30* (2006.01)
*B05C 5/02* (2006.01)
(Continued)

(52) U.S. Cl.
CPC ............ *B05B 1/306* (2013.01); *B05C 5/0225* (2013.01); *B29L 2031/703* (2013.01); *F16D 3/845* (2013.01); *F16J 3/041* (2013.01)

(58) Field of Classification Search
CPC ........... B05B 1/306; F16J 3/041; F16D 3/845; B05C 5/0225; B29L 2031/703
See application file for complete search history.

(56) References Cited

U.S. PATENT DOCUMENTS 4,702,483 A   10/1987 Ukai et al.
6,007,069 A   12/1999 Sadowski
(Continued)

OTHER PUBLICATIONS

International Search Report and Written Opinion from PCT Application Serial No. PCT/US2015/058003, dated Feb. 1, 2016, 15 pages.

*Primary Examiner* — Donnell Long
(74) *Attorney, Agent, or Firm* — Kinney & Lange, P.A.

(57) ABSTRACT

A bellow seal of a fluid dispensing system is disclosed. The bellow seal having a generally circular cross section includes a first end having a first diameter. The bellow seal further includes a second end having a second diameter that is smaller than the first diameter of the first end. The bellow seal further includes a contoured external surface extending between the first end and the second end. The external surface includes a cylindrical portion extending from the first end, an undulating portion, (which includes a convex portion extending from the cylindrical portion and a concave portion extending from the convex portion), and a tapered portion extending from the concave portion to the second end. The bellow seal further includes a flexible region defined between a first point located on the cylindrical portion and a second point located on the concave portion.

20 Claims, 10 Drawing Sheets

(51) Int. Cl.
*B29L 31/00* (2006.01)
*F16D 3/84* (2006.01)
*F16J 3/04* (2006.01)

(56) References Cited

U.S. PATENT DOCUMENTS

| | | | |
|---|---|---|---|
| 2006/0165933 A1* | 7/2006 | Pfeifer | F16D 3/845 428/36.9 |
| 2009/0209353 A1* | 8/2009 | Abels | B29C 45/2612 464/106 |
| 2009/0243232 A1 | 10/2009 | Deisinger et al. | |
| 2011/0285092 A1 | 11/2011 | Ebihara et al. | |
| 2013/0153604 A1 | 6/2013 | Tix et al. | |

* cited by examiner

BELLOWS FLUID SEAL

CROSS-REFERENCE TO RELATED APPLICATIONS

This application claims priority to U.S. Provisional Application No. 62/073,157 filed Oct. 31, 2014, and entitled "BELLOWS FLUID SEAL," the disclosure of which is hereby incorporated in its entirety.

BACKGROUND

Fluid dispensers are widely used for many applications. For example, a fluid dispenser can be used to apply a hot melt adhesive to a working surface such as a packaging surface. Typically, the components of the fluid dispenser are subjected to harsh operating conditions. For example, fluid dispensers can operate at temperatures ranging from about 250° F. to about 350° F. and pressures ranging from about 300 psi to about 600 psi. Additionally, components of the dispenser systems are cycled many times. Operating the dispenser system includes opening and closing an exit port to allow fluid to be selectively dispensed.

The continuous cycling of the components of the fluid dispenser system and harsh operating conditions can cause components of the system to fail. For example, a seal inside the dispenser system can fail after a number of cycles. If a seal fails, then fluid can flow to undesired locations in fluid dispenser system. This can cause extensive damage especially if the fluid is an adhesive.

SUMMARY

According to one embodiment of this disclosure, a bellow seal having a generally circular cross section includes a first end having a first diameter. The bellow seal further includes a second end having a second diameter that is smaller than the first diameter of the first end. The bellow seal further includes a contoured external surface extending between the first end and the second end. The external surface includes a cylindrical portion extending from the first end, an undulating portion, (which includes a convex portion extending from the cylindrical portion and a concave portion extending from the convex portion), and a tapered portion extending from the concave portion to the second end. The bellow seal further includes a flexible region defined between a first point located on the cylindrical portion and a second point located on the concave portion.

According to yet another embodiment of this disclosure, a system for dispensing a fluid includes a manifold configured to regulate a flow air and a flow of the fluid. The system further includes a module for dispensing the fluid. The module includes a first chamber configured to receive the fluid. The module also includes a bellow seal disposed within the first chamber. The bellow seal includes a cylindrical portion, a convex portion, a concave portion, a tapered portion, a flex region, and a passage. The cylindrical portion extends from a first end of the bellow seal and has a first diameter. The convex portion has a second diameter that is smaller than the first diameter and extends from the cylindrical portion. The concave portion extends from the convex portion. The tapered portion extends from the concave portion to a second end. The flex region is defined between a first point located on the cylindrical portion and a second point located on the concave portion. The passage is defined by an internal surface and extends from the first end to the second end. The module also includes a second chamber configured to receive the flow of air, a piston disposed within the second chamber and configured to actuate between a first position and a second position, and a rod having a first end secured to the piston. The rod extends through the bellow seal passage and has a second end configured to engage a fluid outlet port.

DETAILED DESCRIPTION

A bellow seal for a liquid dispensing system is disclosed. The bellow seal is located within a dispensing module of the system. In order to better understand bellow seal, the liquid dispensing system will be described as a whole with reference to FIGS. 1, 2A, 2B, 3A and 3B. In order to understand the environment in which the bellow seal functions, the dispensing module will be described with reference to FIGS. 4A and 4B. Finally, the bellow will seal will be described with reference to FIGS. 5A, 5B, and 5C.

Overall Liquid Dispensing System (FIGS. 1, 2A, 2B, 3A, and 3B)

Figure 1:
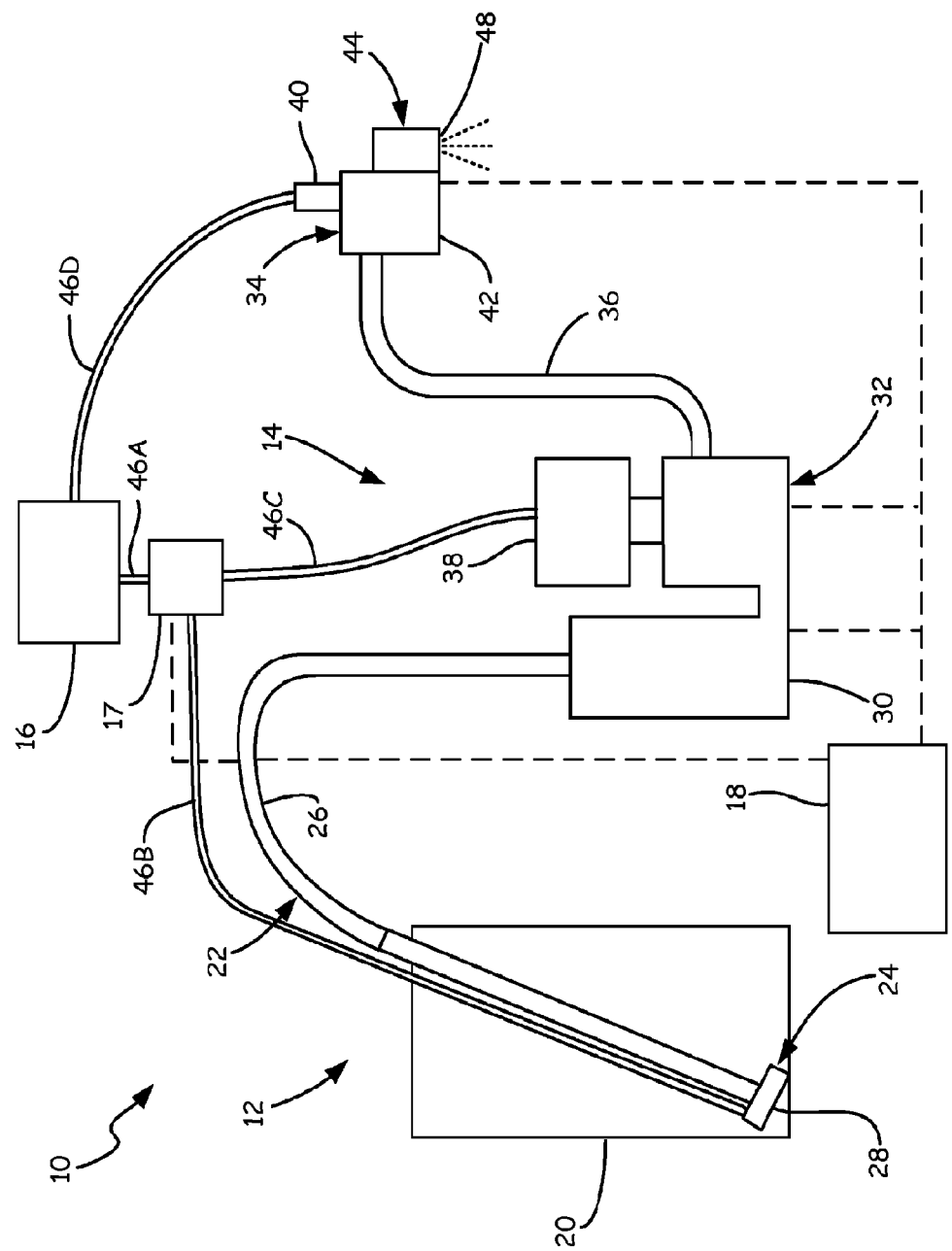
FIG. 1 is a schematic view of a system for dispensing liquid adhesive.

FIG. 1 is a schematic view of system 10 for dispensing liquid adhesive, such as hot melt adhesive for example. System 10 includes cold section 12, hot section 14, air source 16, air control valve 17, and controller 18. In the embodiment shown in FIG. 1, cold section 12 includes container 20 and feed assembly 22. Feed assembly 22 includes vacuum assembly 24, feed hose 26, and inlet 28. Hot section 14 includes melt system 30, pump 32, dispensing system 34, and supply hose 36. Pump 32 includes motor 38. Dispensing system 34 includes solenoid assembly 40, manifold 42, and dispensing module 44.

Air source 16 is a source of compressed air supplied to components of system 10 in both cold section 12 and hot section 14. Air control valve 17 is connected to air source 16 via air hose 46a, and air control valve 17 selectively controls air flow from air source 16 through air hose 46b to vacuum assembly 24 and through air hose 46c to motor 38 of pump 32. Air hose 46d connects air source 16 to solenoid assembly 40 of dispensing system 34, bypassing air control valve 17. Solenoid assembly 40 controls the flow of compressed air to dispensing module 44 to actuate dispensing module 44 between an open position, thereby dispensing liquid adhesive, and a closed position, thereby preventing liquid adhesive from being dispensed. Controller 18 is in communication with various components of system 10, such as air control valve 17, melt system 30, pump 32, and/or dispensing system 34 and various components thereof, for controlling the operation of system 10.

Components of cold section 12 can be operated at room temperature, without being heated. Container 20 can be a hopper for containing a quantity of solid adhesive pellets. Suitable adhesives can include, for example, a thermoplastic polymer glue such as ethylene vinyl acetate (EVA) or metallocene. Feed assembly 22 connects container 20 to hot section 14 for delivering the solid adhesive pellets from container 20 to hot section 14. Feed assembly 22 includes vacuum assembly 24 and feed hose 26. Vacuum assembly 24 is positioned in container 20. Compressed air from air source 16 is delivered to vacuum assembly 24 to create a vacuum, inducing a flow of solid adhesive pellets into inlet 28 of vacuum assembly 24 and then through feed hose 26 to hot section 14. Feed hose 26 is a tube or other passage sized with a diameter substantially larger than that of the solid adhesive pellets to allow the solid adhesive pellets to flow freely through feed hose 26. Feed hose 26 connects vacuum assembly 24 to hot section 14.

Solid adhesive pellets are delivered from feed hose 26 to melt system 30. Melt system 30 can include a tank and resistive heating elements for melting the solid adhesive pellets to form a liquid hot melt adhesive. Melt system 30 can be sized to have a relatively small adhesive volume, for example about 0.5 liters, and configured to melt solid adhesive pellets in a relatively short period of time. Pump 32 is driven by motor 38 to pump hot melt adhesive from melt system 30, through supply hose 36, and to dispensing system 34. Motor 38 can be an air motor driven by pulses of compressed air from air source 16 and air control valve 17. Pump 32 can be a linear displacement pump driven by motor 38.

Hot melt adhesive from pump 32 is received in manifold 42 and dispensed via dispensing module 44. Dispensing system 34 can selectively discharge hot melt adhesive through dispensing module 44, whereby the hot melt adhesive is sprayed out outlet 48 of dispensing module 44 onto an object, such as a package, a case, or another object benefiting from hot melt adhesive dispensed by system 10. Dispensing module 44 is actuated between an open mode, whereby the hot melt adhesive is sprayed out of outlet 48, and a closed mode, whereby the hot melt adhesive is prevented from spraying out of outlet 48, by solenoid assembly 40. Solenoid assembly 40 provides compressed air to dispensing module 44 to actuate dispensing module 44 between the open and the closed positions. Dispensing module 44 can be one of multiple modules that are part of dispensing system 34. Some or all of the components in hot section 14, including melt system 30, pump 32, supply hose 38, manifold 42, and dispensing module 44, can be heated to keep the hot melt adhesive in a liquid state during the dispensing process.

Figure 2A:
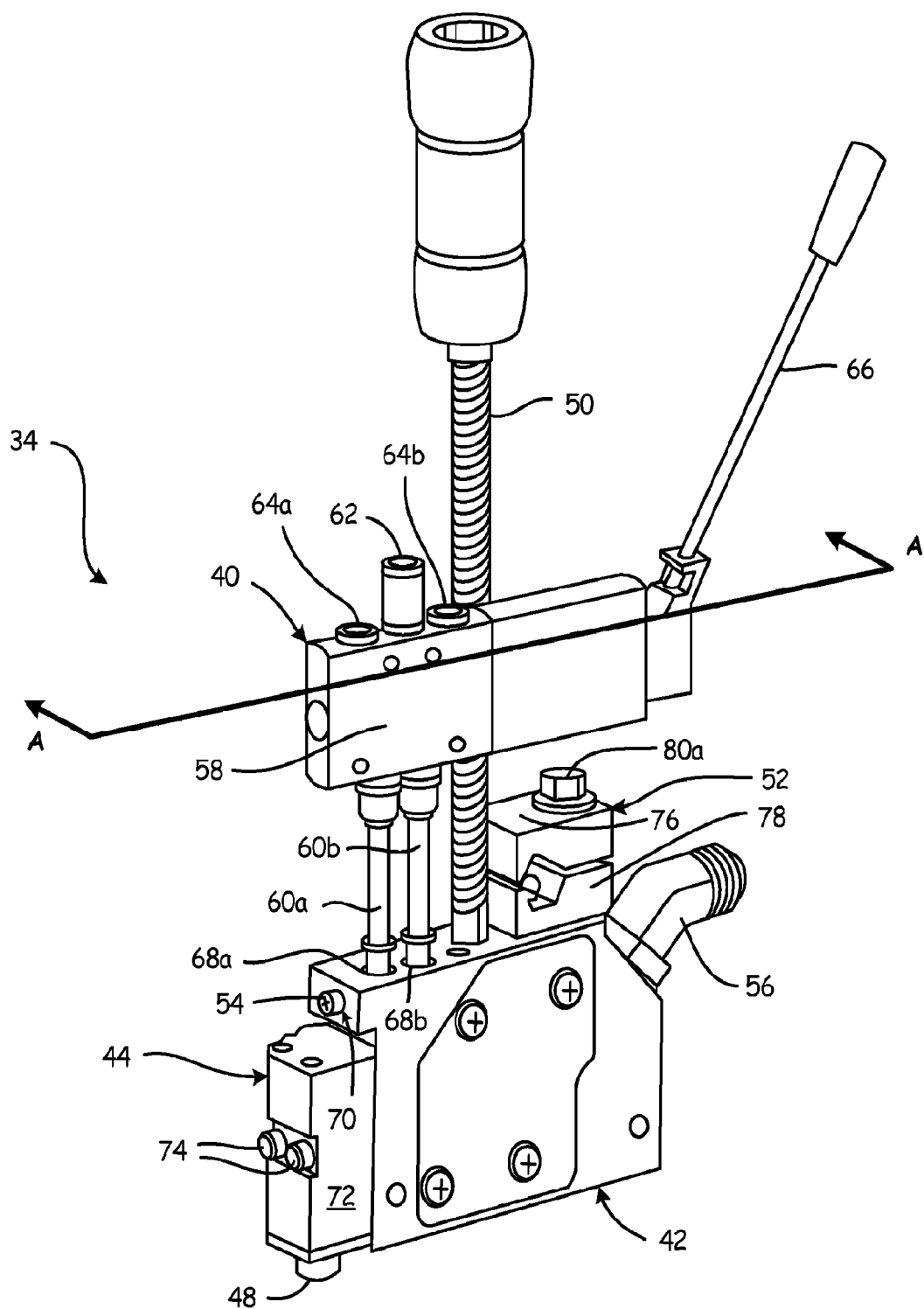
FIG. 2A is a perspective view of a dispensing system with a solenoid assembly attached.
Figure 2B:
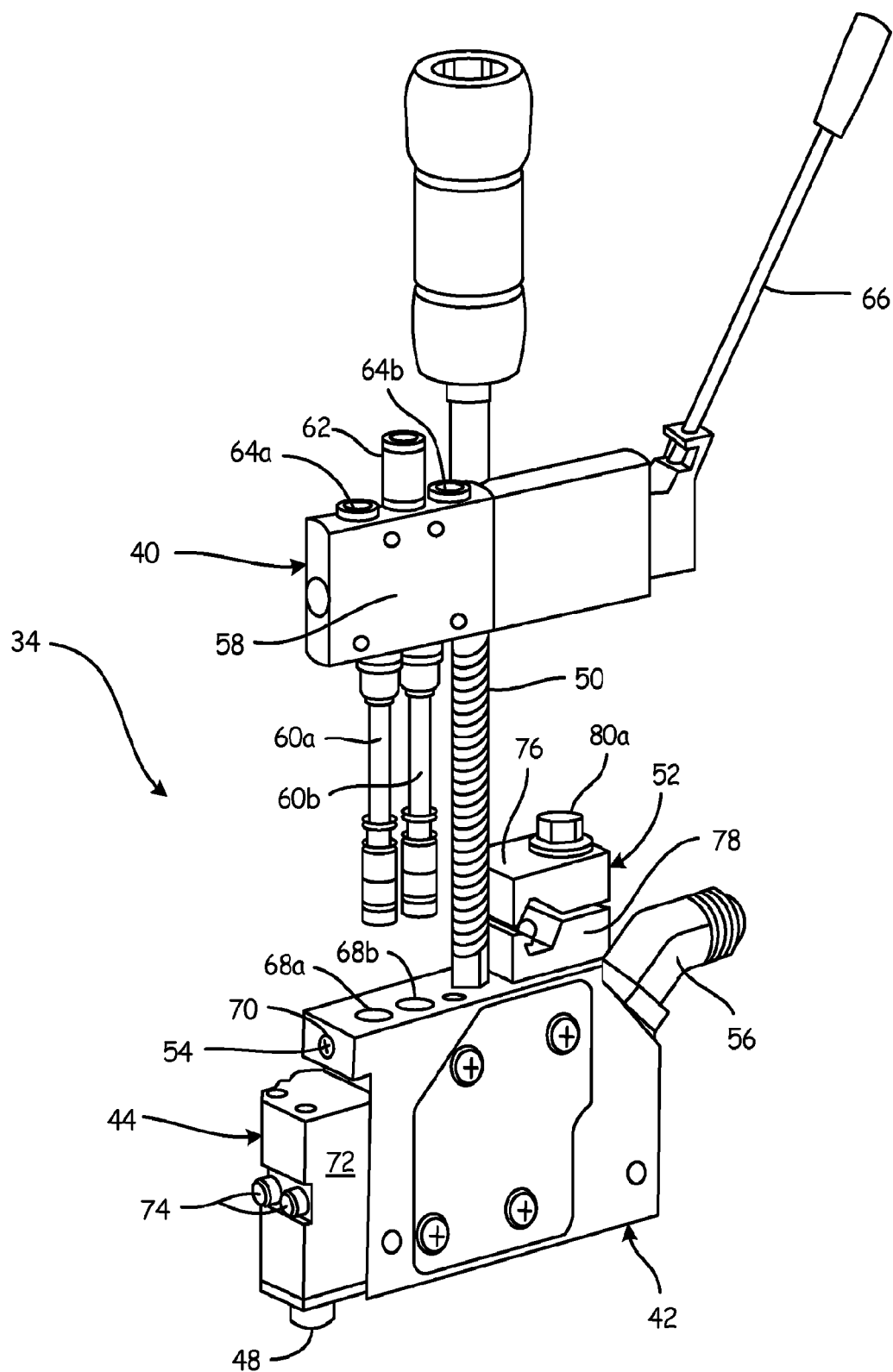
FIG. 2B is a perspective view of the dispensing system of FIG. 2A with the solenoid assembly attached.

FIG. 2A is a perspective view of dispensing system 34, including a single dispensing module 44, with solenoid assembly 40 attached. FIG. 2B is a perspective view of dispensing system 34 with solenoid assembly 40 detached. FIGS. 2A and 2B will be discussed together. Dispensing system 34 includes solenoid assembly 40, manifold 42, dispensing module 44, cordset 50, mounting clamp 52, quick release mechanism 54, and fluid inlet 56. Solenoid assembly 40 includes solenoid valve 58, air tubes 60a, 60b, air inlet 62, exhaust ports 64a, 64b, and solenoid cable 66. Manifold 42 includes air tube openings 68a, 68b and quick release opening 70. Dispensing module 44 includes outlet 48, body 72, and fasteners 74. Mounting clamp 52 includes upper portion 76, lower portion 78, and fasteners 80a and 80b (shown in FIG. 3A).

Fluid inlet 56 is attached to manifold 42 and receives liquid adhesive from supply hose 36 (shown in FIG. 1). Dispensing module 44 is attached to manifold 42 by fasteners 74 passing through dispensing module 44 and into manifold 42. The liquid adhesive enters manifold through fluid inlet 56 and flows through manifold 42 to dispensing module 44, where the liquid adhesive is dispensed. Cordset 50 extends into manifold 42 and provides power to heating elements (not shown) within manifold 42. The heating elements ensure that the liquid adhesive flowing through manifold 42 remains in a liquid state.

Mounting clamp 52 is secured to a top of manifold 42. Fastener 80a passes through both upper portion 76 and lower portion 78 and into manifold 42. Fastener 80b passes through lower portion 78 and secures lower portion 78 to manifold 42. In this way, lower portion 78 may remain secured to manifold 42 while upper portion 76 may be removed to allow mounting clamp 52 to be positioned around a suitable mounting device, such as a mounting bar, to allow a user to position dispensing system 34 in any desired position.

Quick release mechanism 54 extends into quick release opening 70 of manifold 42. In the illustrated embodiment, quick release opening 70 is threaded such that quick release opening 70 receives a threaded quick release mechanism 54. It is understood, however, that quick release opening 70 and quick release mechanism 54 may be of any suitable combination to allow quick release mechanism 54 to be retained within but easily removable from quick release opening 70. For example, quick release opening 70 may be a smooth bore, while quick release mechanism 54 may be a detented dowel configured to engage a projection either within quick release opening 70 or on one of air tubes 60a, 60b.

Solenoid cable 66 is connected to and provides power to solenoid valve 58. Air tubes 60a, 60b are connected to solenoid valve 58. Air tube 60a is in fluid communication with air inlet 62 and exhaust port 64a. Similarly, air tube 60b is in fluid communication with air inlet 62 and exhaust port 64b. Solenoid valve 58 may be any suitable solenoid valve for directing compressed air through air tubes 60a, 60b and to dispensing module 44. For example, solenoid valve 58 may be a five-way exhausting solenoid valve with an internal piston that directs compressed air from air inlet 62 through one of air tubes 60a, 60b, while simultaneously allowing previously utilized compressed air to exhaust through the other one of air tube 60a, 60b and to the atmosphere through either exhaust port 64a or exhaust port 64b.

In FIG. 2A solenoid assembly 40 is shown attached to manifold 42. Air tubes 60a, 60b extend into air tube openings 68a, 68b, respectively. Air tubes 60a, 60b are freely slidable within air tube openings 68a, 68b unless secured by quick release mechanism 54. Quick release mechanism 54 extends into quick release opening 70 of manifold 42 and engages air tube 60a. As air tubes 60a and 60b are preferably rigid and as such quick release mechanism 54 engaging air tube 60a secures solenoid assembly 40 to manifold 42. While quick release mechanism 54 is described as engaging air tube 60a, it is understood that quick release mechanism may engage air tube 60b or both air tubes 60a and 60b.

In FIG. 2B solenoid assembly 40 is shown as detached from manifold 42. In the illustrated embodiment, quick release mechanism 54 is shown as a single set screw; it is understood however, that quick release mechanism 54 may take any suitable shape for securing solenoid assembly 40 to manifold 42 while still allowing a user to quickly and efficiently release and remove solenoid assembly 40. For example, quick release mechanism 54 may be a push piston, a detented dowel, a sheet metal cover, a hinged bracket, or any other suitable mechanism. In the illustrated embodiment, rotating quick release mechanism 54 within quick release opening 70 causes quick release mechanism 54 to disengage from air tube 58a, thereby freeing solenoid assembly 40. The user may then easily remove solenoid assembly 40 by simply pulling solenoid assembly 40 free from manifold 42. As shown, quick release mechanism 54 may remain partially within quick release opening 70, yet solenoid assembly may still be removed from manifold 42.

Quick release mechanism 54 allows a user to quickly remove and replace solenoid assembly 40, which minimizes any down time caused on an assembly line due to solenoid failures. Quick release mechanism 54 may be activated by a simple movement such as a turn, though it is understood that other embodiments of quick release mechanism may be activated through other simple movements, such as a push or pull.

Figure 3A:
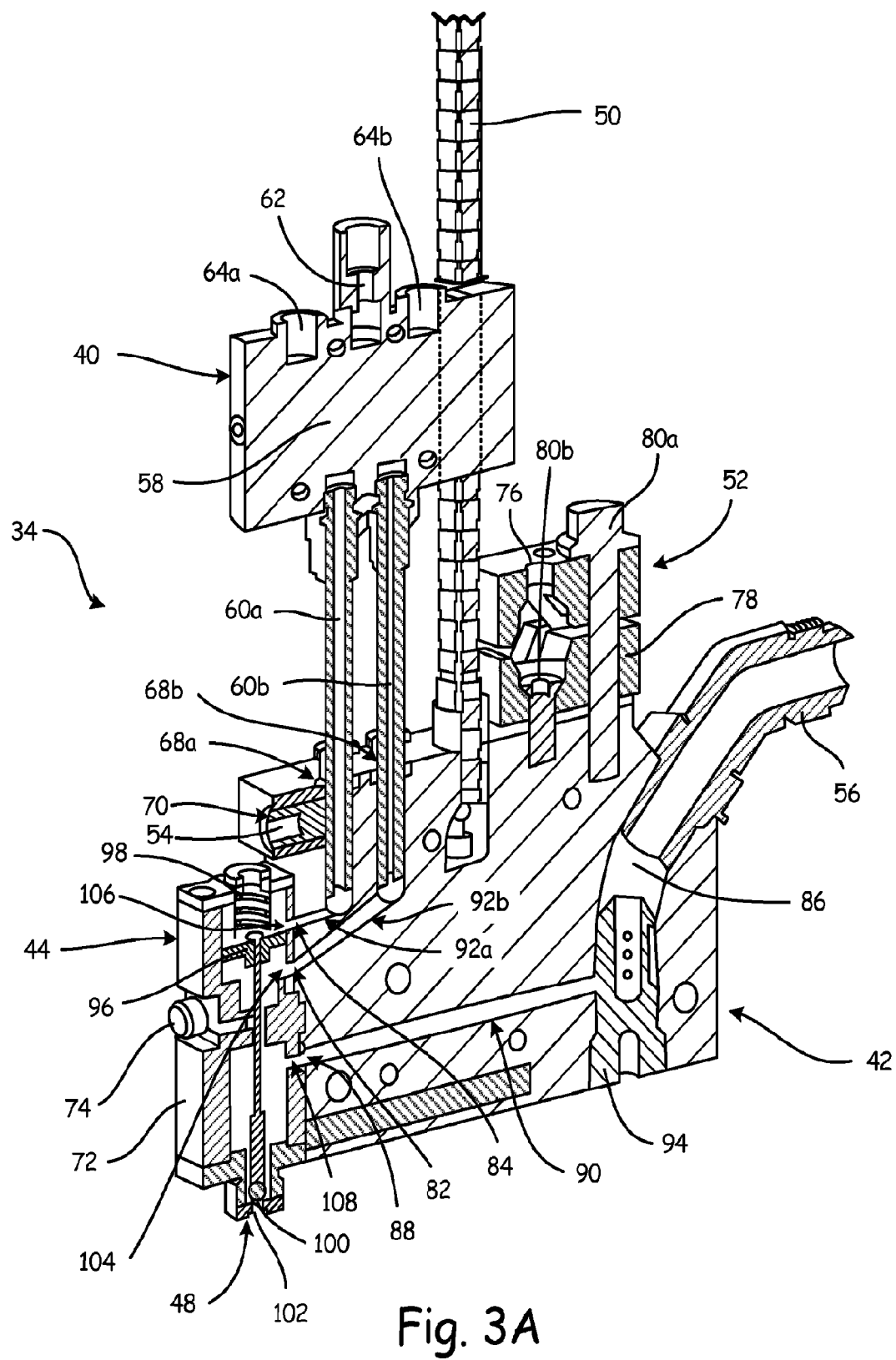
FIG. 3A is a cross-sectional view of the dispensing system of FIG. 2A taken along line A-A of FIG. 2A.
Figure 3B:
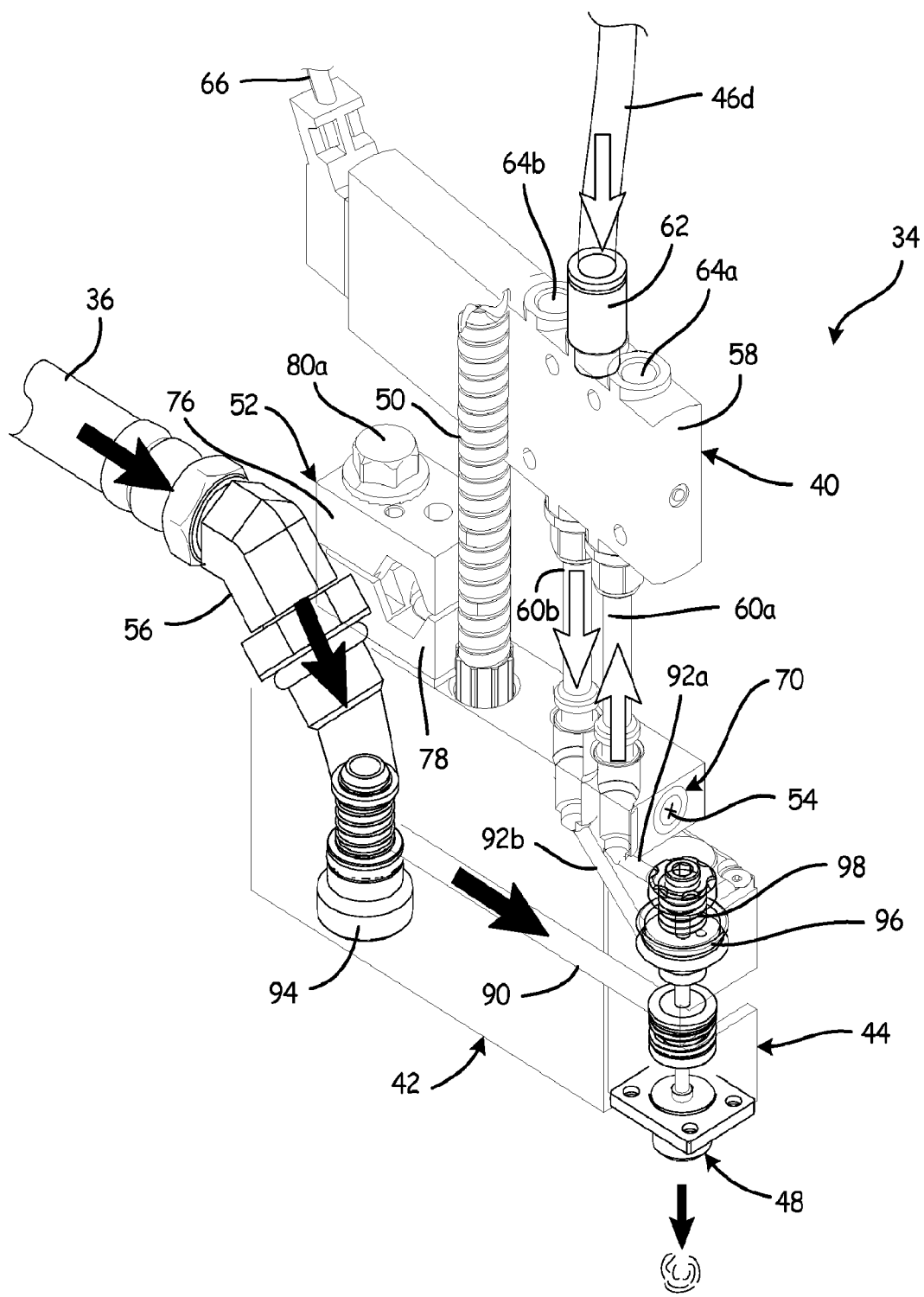
FIG. 3B is a perspective view of the dispensing system showing the flow of liquid adhesive and compressed air through the dispensing system.

FIG. 3A is a cross-sectional view of dispensing system 34 taken along line A-A in FIG. 2A. FIG. 3B is a perspective view of dispensing system 34 showing flow lines of liquid adhesive and compressed air through dispensing system 34. FIGS. 3A and 3B will be discussed together. Dispensing system 34 includes solenoid assembly 40, manifold 42, dispensing module 44, cordset 50, mounting clamp 52, quick release mechanism 54, and fluid inlet 56. Solenoid assembly 40 includes solenoid valve 58 (the internal components of which are not shown), air tubes 60a, 60b, air inlet 62, exhaust ports 64a, 64b, and solenoid cable 66 (shown in FIG. 3B). Manifold 42 includes air tube openings 68a, 68b, quick release opening 70, first module actuation opening 82, second module actuation opening 84, adhesive inlet 86, adhesive outlet 88, adhesive flow path 90, air flow paths 92a, 92b, and filter 94. Dispensing module 44 includes outlet 48, body 72, fasteners 74, piston 96, spring 98, ball 100, seat 102, open inlet 104, close inlet 106, and adhesive inlet 108. Mounting clamp 52 includes upper portion 76, lower portion 78, and fasteners 80a, 80b.

Fluid inlet 56 is connected to manifold 42 and secured within adhesive inlet 86. Adhesive flow path 90 extends between adhesive inlet 86 and adhesive outlet 88, and filter 94 is disposed within adhesive flow path 90. Fasteners 74 extend through dispensing module 44 and attach dispensing module 44 to manifold 42. When dispensing module 44 is attached to manifold 42, adhesive inlet 108 is aligned with adhesive outlet 88 to allow dispensing module 44 to receive liquid adhesive from manifold 42. Similarly, open inlet 104 is aligned with first module actuation opening 82 and close inlet 106 is aligned with second module actuation opening 84 such that dispensing module 44 may receive compressed air through manifold 42 to allow dispensing module 44 to be actuated between an open position and a closed position.

Piston 96 is disposed within body 72 of dispensing module and piston is arranged between open inlet 104 and close inlet 106. Spring 98 is disposed within body 72 on top of piston 96, and spring 98 biases piston 96 downward such that dispensing module 44 is in a normally-closed position when no compressed air is provided to dispensing module 44. Ball 100 is attached to an end of piston 96, and ball 100 rests in seat 102 to prevent liquid adhesive from exiting dispensing module 44.

Cordset 50 extends into manifold 42 and provides power to heating elements (not shown) within manifold 42. The heating elements ensure that the liquid adhesive flowing through manifold 42 remains in a liquid state. Mounting clamp 52 is secured to a top of manifold 42. Fastener 80a passes through both upper portion 76 and lower portion 78 and into manifold 42. Fastener 80b passes through lower portion 78 and secures lower portion 78 to manifold 42. In this way, lower portion 78 may remain secured to manifold 42 while upper portion 76 may be removed to allow mounting clamp 52 to be positioned around a suitable mounting device, such as a mounting bar, to allow a user to position dispensing system 34.

Quick release mechanism 54 extends into quick release opening 70 of manifold 52. Quick release mechanism 54 is configured to engage at least one of air tubes 60a, 60b thereby securing solenoid assembly 40 to manifold 42. In the illustrated embodiment, quick release mechanism 54 is a set screw configured to engage air tube 60a. Engaging air tube 60a secures solenoid assembly 40 to manifold 42 as air tube 60a is preferably constructed of a rigid material, such as aluminum, and air tube 60a is connected to fluid inlet 56. It is understood that quick release mechanism 54 may take any suitable form for engaging at least one of air tubes 60a, 60b. For example, air tubes 60a, 60b may include an exterior threading and quick release mechanism 54 may be configured with compatible threading such that quick release mechanism 54 passes by and engages the external threading of both air tube 60a and air tube 60b. Quick release mechanism 54 allows a user to quickly detach, with a simple twist, push, or pull, solenoid assembly 40 from manifold 42 and replace solenoid assembly 40 in case of a failure of solenoid assembly 40.

Air tubes 60a, 60b are connected to solenoid valve 58 and extend into air tube openings 68a, 68b of manifold 42, respectively. Air flow path 92a extends through manifold 42 between air tube 60a and second module actuation opening 84. In this way, compressed air may be provided to dispensing module 44 through air inlet 62, solenoid valve 58, air tube 60a, air flow path 92a, second module actuation opening 84, and close inlet 106. Compressed air may also be exhausted from dispensing module 44 through close inlet 106, second module actuation opening 84, air flow path 92a, air tube 60a, solenoid valve 58, and exhaust port 64a. Similarly, air flow path 92b extends through manifold 42 between air tube 60b and first module actuation opening 82. In this way, compressed air may be provided to dispensing module 44 through air inlet 62, solenoid valve 58, air tube 60b, air flow path 92b, first module actuation opening 82, and open inlet 104. Compressed air may also be exhausted from dispensing module 44 through open inlet 104, first module actuation opening 82, air flow path 92b, air tube 60b, solenoid valve 58, and exhaust port 64b.

As shown in FIG. 3B, dispensing module 44 is typically in a closed position, as previously discussed. To actuate dispensing module 44 from a closed position to an open position, a first portion of compressed air is provided through air hose 46d and enters solenoid valve 58 through air inlet 62. Solenoid valve 58 directs the first portion of compressed air through air tube 60b and the first portion of compressed air enters manifold 42. The first portion of compressed air flows through air flow path 92b and exits manifold 42 through first module actuation opening 82. The first portion of compressed air then enters dispensing module 44 through open inlet 104 (best seen in FIG. 3A), and the first portion of compressed air forces piston 96 up, overcoming the force of spring 98. With piston 96 forced up, ball 100 (shown in FIG. 3A) disengages from seat 102 (shown in FIG. 3A), thereby allowing liquid adhesive to exit dispensing module 44 through outlet 48.

The liquid adhesive is provided to dispensing system 34 through supply hose 36 (shown in FIG. 1). The liquid adhesive enters fluid inlet 56 from supply hose 36 and enters manifold 42 through adhesive inlet 86. The liquid adhesive flows along adhesive flow path 90 and exits manifold 42 through adhesive outlet 88. While the liquid adhesive is flowing through manifold 42, cordset 50 provides power to heating elements (not shown) located within manifold 42, and the heating elements provide sufficient heat to the liquid adhesive to prevent the liquid adhesive from solidifying within manifold 42. After the liquid adhesive exits adhesive outlet 88, the liquid adhesive enters dispensing module 44 through adhesive inlet 108. The liquid adhesive is then dispensed onto a desired surface through outlet 48.

After the liquid adhesive is applied to the desired surface, the flow of liquid adhesive through dispensing module 44 may be shut off. Solenoid valve 58 is actuated such that a second portion of compressed air is directed to air tube 60a instead of air tube 60b. Shifting solenoid valve 58 also opens a flow path through solenoid valve 58 between air tube 60b and exhaust port 64b. The second portion of compressed air exits solenoid valve 58 through air tube 60a and flows through air flow path 92a to dispensing module 44. The second portion of compressed air enters dispensing module 44 through close inlet 106 (best seen in FIG. 3A), and the second portion of compressed air, aided by spring 98, forces piston 96 down. As piston 96 is forced down, ball 100 reengages seat 102, thereby shutting off the flow of liquid adhesive through outlet 48.

While piston 96 is shifting from the up position to the down position, the first portion of compressed air is forced out of dispensing module 44. The first portion of compressed air exits dispensing module 44 through open inlet 104 (best seen in FIG. 3A) and enters air flow path 92b. The first portion of compressed air flows back through air flow path 92b and through air tube 60b. The first portion of compressed air is then exhausted to the atmosphere through exhaust port 64b. It is understood that the second portion of compressed air is similarly exhausted through exhaust port 64a when piston 96 is actuated from the closed to the open position. In order to better understand the environment in which the bellow seal is located, dispensing module 44 will be described in further detail bellow with reference to FIGS. 4A and 4B.

Figure 4A:
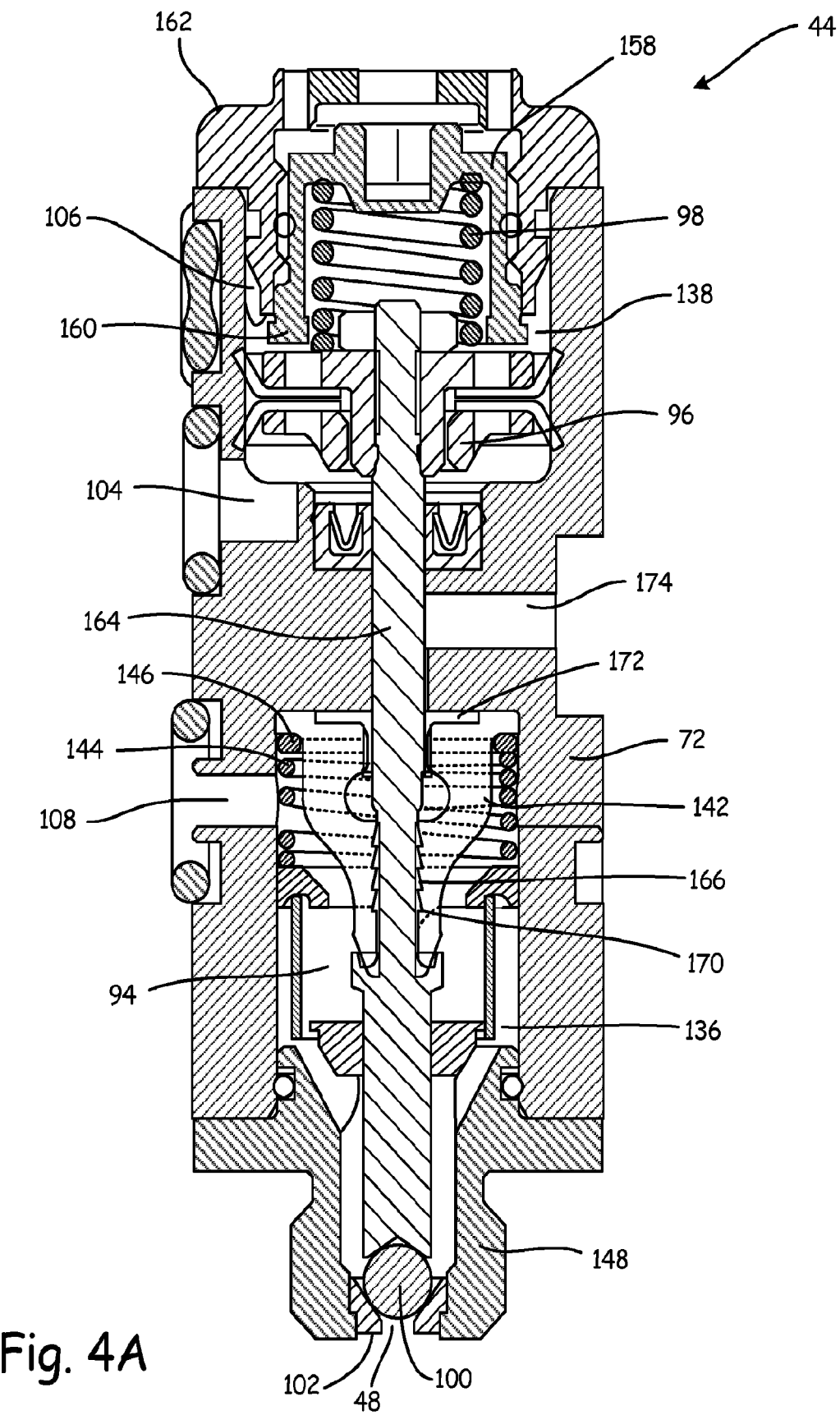
FIG. 4A is a cross-sectional view the dispensing module of the dispensing system, showing a closed outlet.
Figure 4B:
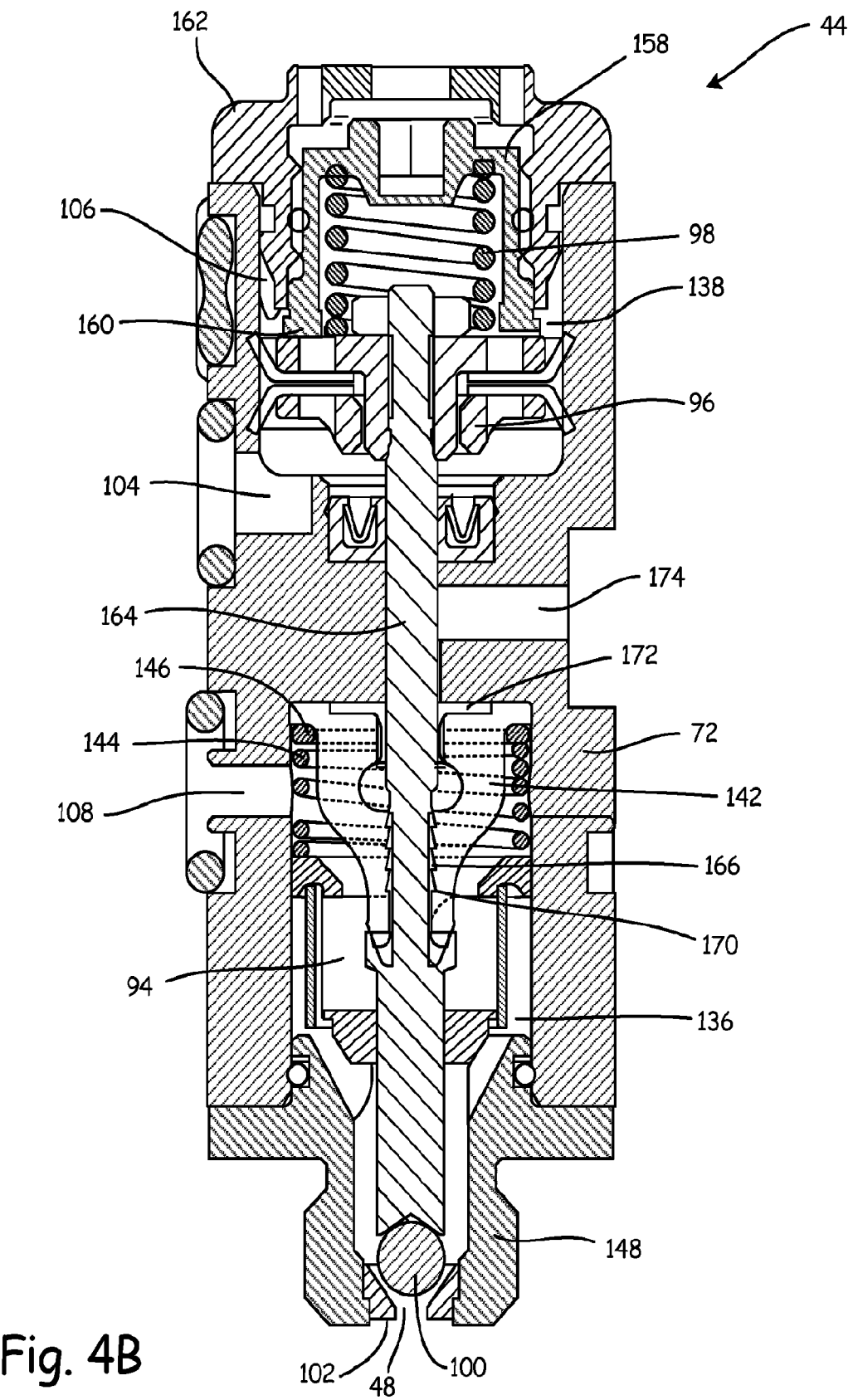
FIG. 4B is cross-sectional view of the dispensing module of the fluid dispensing system, showing an open outlet.

Dispensing Module (FIGS. 4A and 4B)

FIGS. 4A and 4B are cross-sectional views of dispensing module 44. FIG. 4A shows dispensing module 44 with outlet 48 closed and FIG. 4B shows outlet 48 open. Given the similarity in FIGS. 4A and 4B, they will be discussed concurrently.

FIGS. 4A and 4B illustrate body 72, first chamber 136, and second chamber 138. First chamber 136 includes bellow seal 142, bellow spring 144, washer 146, fluid cap 148, and outlet 48. Second chamber 138 includes spring 98, spring housing 158, abutment region 160, and air cap 162. FIGS. 4A and 4B also illustrate rod 164, which includes fitting projection 166 and ball 100. Recess 170 and bearing 172 of bellow seal 142 and weep hole 174 are also illustrated.

Dispensing module 44 is defined in part by body 72, which forms first chamber 136 and second chamber 138. First chamber 136 is located below second chamber 138 and receives the fluid from manifold 42. Adhesive inlet 108 is formed in body 72. First chamber 136 is sealed from second chamber 138 by bellow seal 142. Bellow seal 142 is fixed to body 72 on one side. Bellow seal 142 is also fixed to bellow spring 144 on an opposite end by washer 146. First chamber 136 is, additionally, sealed in part by fluid cap 148. Outlet 48 is formed in fluid cap 148. Filter 94 is disposed within first chamber 136 between adhesive inlet 108 and outlet 48.

Body 72 also forms second chamber 138. Open inlet 104 and close inlet 106 are formed in body 72 and extend into second chamber 138. Piston 96 is disposed within second chamber 138 and is biased against spring 98 as described above. Spring 98 is disposed within spring housing 158, which includes abutment region 160. Air cap 162 is attached to spring housing 158 and seals an end of second chamber 138.

Rod 164 is disposed within both first chamber 136 and second chamber 138. Rod 164 is secured to bellow seal 142 and is part of piston 96. Rod 164 can be secured to bellow seal 142 by fitting projection 166 of rod 164 into recess 170 of bellow seal 142. Rod 164 also passes through bearing 172, which is disposed within bellow seal 142. Ball 100 is shown as engaged against seat 102 in FIG. 4A and shown as disengaged with seat 102 in FIG. 4B. Ball 100 is shown as a ball but can take on other shapes in further embodiments. Weep hole 174 is bored through body 72 between first chamber 136 and second chamber 138.

In operation, fluid and air are supplied to dispensing module 44 as described above. After fluid enters first chamber 136, fluid passes between body 72 and bellow seal 142. Fluid then passes through filter 94. Filter 94 can be made of a mesh material and prevents solid materials, such as charred adhesive material, from passing to outlet 48. After passing through filter 94, fluid flows to outlet 48.

As the air is supplied to second chamber 138, piston 96 is translated upwards as described above. The upward translation of piston 96 is stopped when piston 96 contacts abutment region 160 of spring housing 158. Upward translation of piston 96 can also be stopped by cutting off the supply of air to second chamber 138. Rod 164 translates upward as piston 96 translates upward. This causes ball 100 of rod 164 to disengage seat 102 as shown in FIG. 4B. With ball 100 disengaged from seat 102, fluid can exit dispensing module 44. The total distance that rod 164 travels is referred to as a stroke length. The stroke length can be optimized to be the minimum length required to achieve a desired flow of fluid from outlet 48. For example, the stroke length can range from about 0.005 inches to about 0.040 inches although additional stroke lengths are contemplated.

When the air supply to second chamber 138 is reduced or stopped, spring 98 causes piston 96 to translate downward to its original position. This causes rod 164 to translate downward accordingly. The downward translation of rod 164 results in ball 100 engaging seat 102 as shown in FIG. 4A. One cycle of dispensing module 44 constitutes ball 100 moving between an engaged position on seat 102 to a disengaged positon and back to the engaged position.

The upward translation of rod 164 also causes a portion of bellow seal 142 to compress. This portion is a flex region and is discussed in more detail below. Rod 164 is secured to bellow seal 142 by the engagement of fitting projection 166 and recess 170. Rod 164 is additionally stabilized within bellow seal 142 by bearing 172.

Bellow seal 142 functions to seal first chamber 136 from second chamber 138 while still allowing for the translation of rod 164. In the event that bellow seal 142 fails and fluid passes from first chamber 136 towards second chamber 138, then fluid will exit weep hole 174. This indicates that bellow seal has failed and requires replacement. The design of bellow seal 142 can affect the number of cycles bellow seal 142 can go through before replacement is required. The design of bellow seal 142 is described below with reference to FIGS. 5A-5C.

Figure 5A:
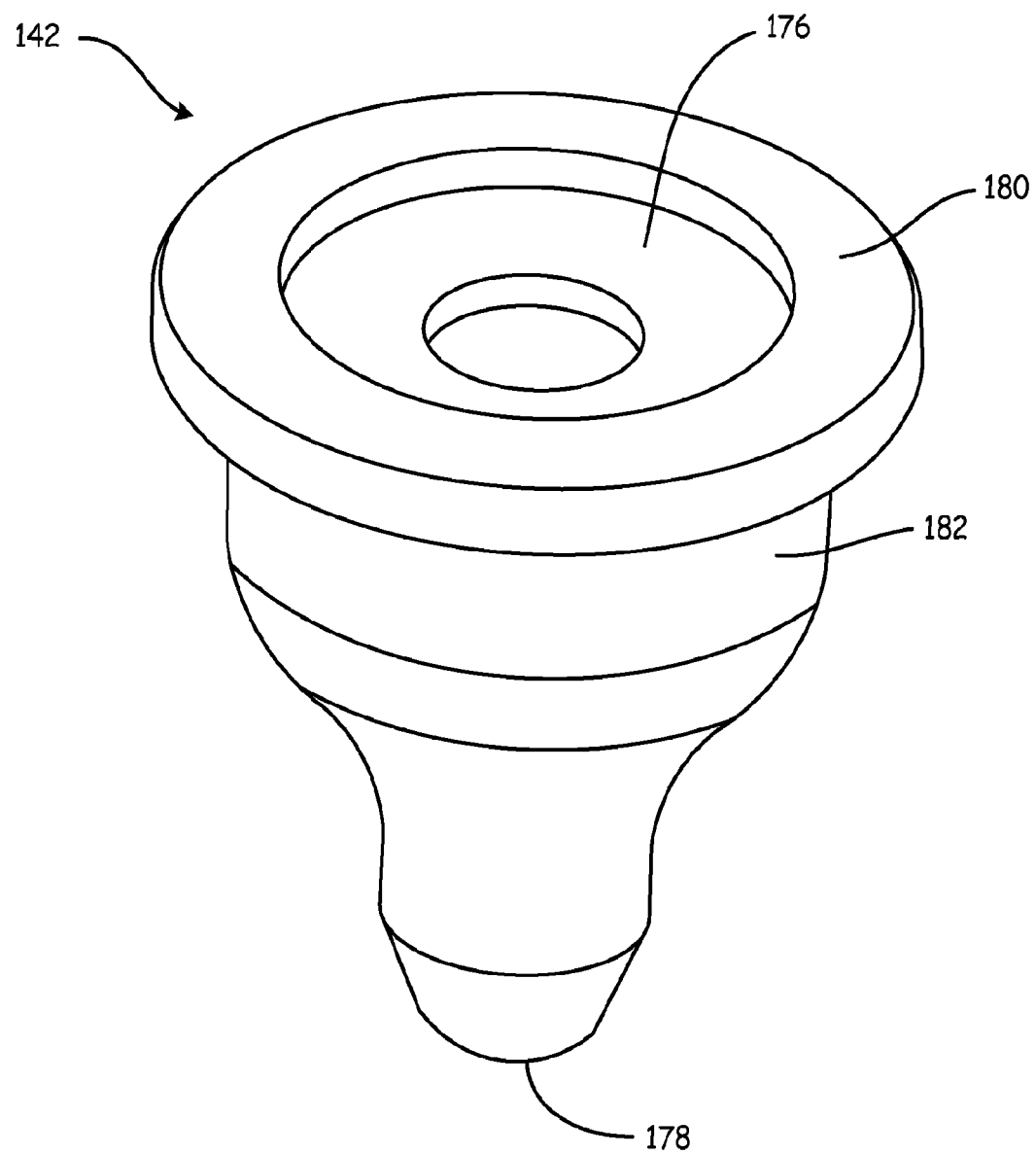
FIG. 5A is a perspective view of a bellow seal of the dispensing module.
Figure 5B:
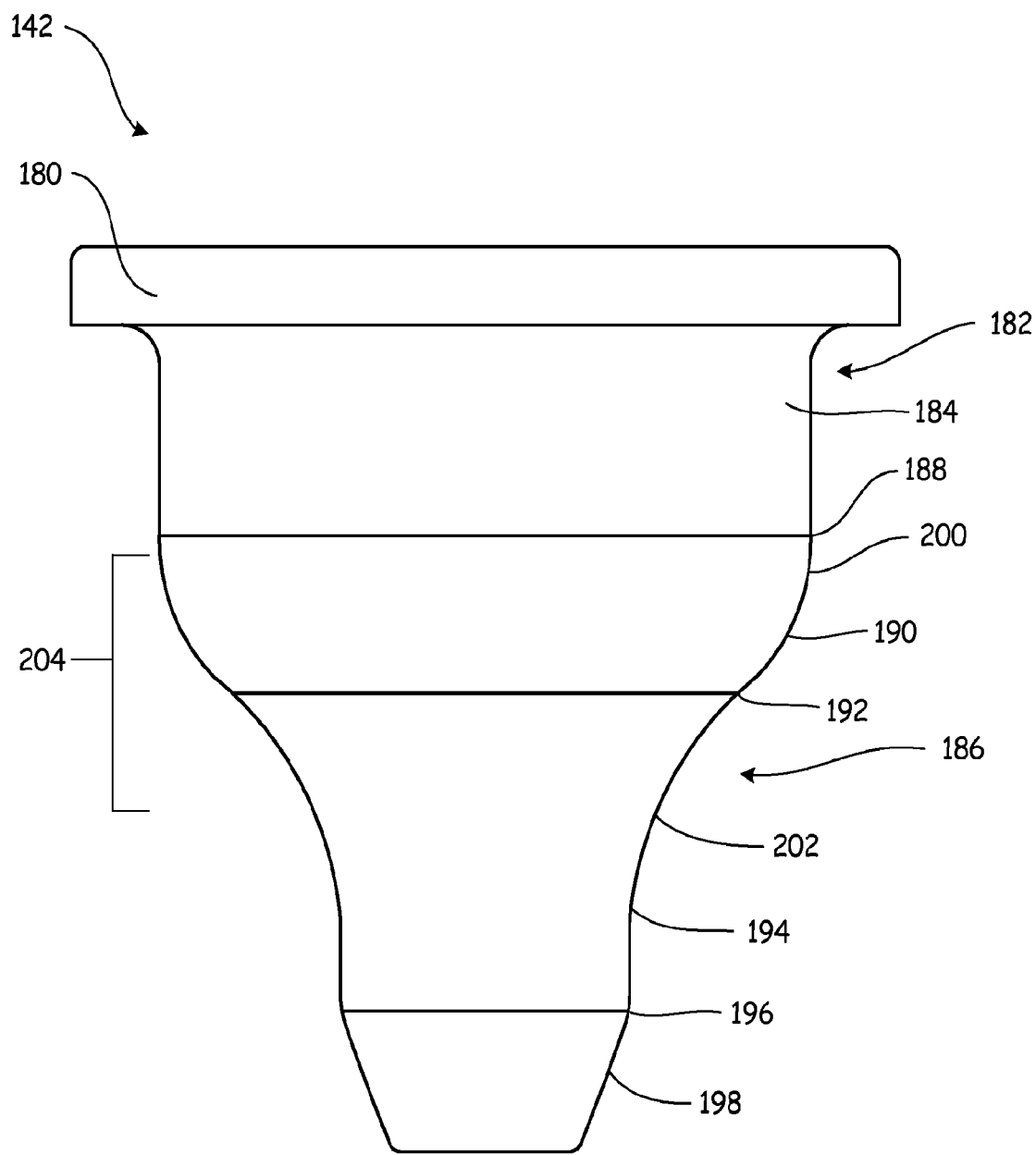
FIG. 5B is a plan view of the bellow seal of the dispensing module.
Figure 5C:
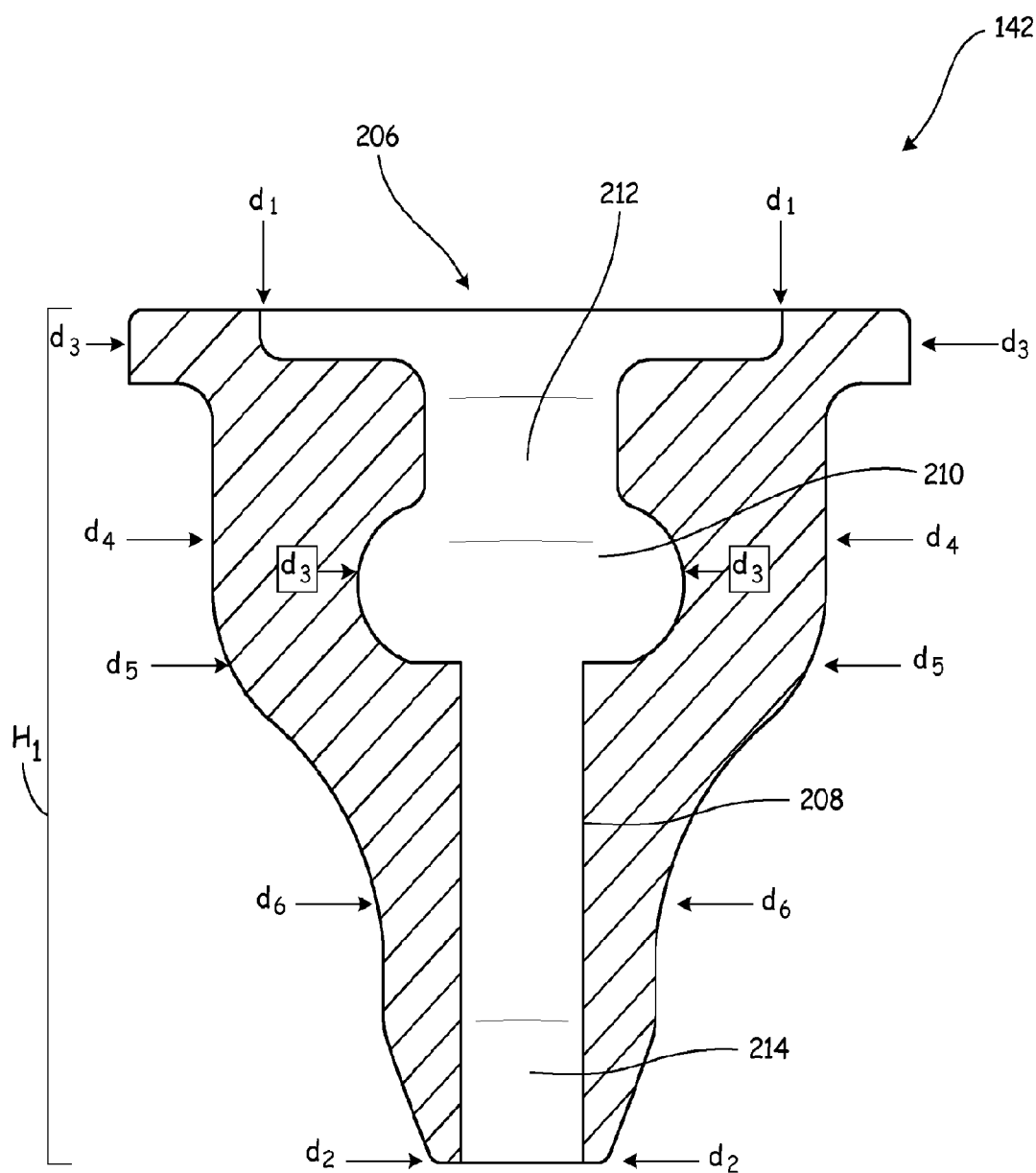
FIG. 5C is a cross-sectional view of bellow seal of the dispensing module.

Bellow Seal (FIGS. 5A, 5B, and 5C)

FIG. 5A is a perspective view of bellow seal 142, FIG. 5B is a plan view of bellow seal 142, and FIG. 5C is a cross-sectional view of bellow seal 142. Because FIGS. 5A-5C generally show the same features, they will be discussed concurrently. FIGS. 5A-5C illustrate first end 176, second end 178, and flange 180. FIGS. 5A-5C also illustrate external surface 182, cylindrical portion 184, undulating portion 186, first transition point 188, convex portion 190, second transition point 192, concave portion 194, third transition point 196, tapered portion 198, first mid-point 200, second mid-point 202, and flex region 204. FIG. 5C additionally illustrates passage 206, internal surface 208, inner bulbous cavity 210, upper bore 212, and lower bore 214.

Bellow seal 142 includes first end 176 and second end 178. A diameter $d_1$ of first end 176 is greater than a diameter $d_2$ at second end 178. In a non-limiting embodiment of bellow seal 142, diameter $d_1$ can be approximately four times larger than diameter $d_2$. This is best shown in FIG. 5C. First end 176 can optionally include flange 180, which can have a diameter $d_3$ approximately 1.5 times larger than diameter $d_1$ although this disclosure is not so limited.

Bellow seal 142 has a generally circular cross section. Bellow seal 142 can be formed from a generally resilient material such as rubber or silicone. External surface 182 of bellow seal 142 is contoured and formed from a number of portions between first end 176 and second end 178. Those portions include cylindrical portion 184, undulating portion 186, and tapered portion 198. Undulating portion 186 is formed from convex portion 190 and concave portion 194.

Cylindrical portion 184 extends from first end 176 to first transition point 188. At first transition point 188 the contour of cylindrical portion 184 changes from a vertical wall to a convex wall. Convex portion 190 extends from first transition point 188 to second transition point 192. At second transition point 192, the contour of convex portion 190 changes from a convex wall to a concave wall. Concave portion 194 extends from second transition point 192 to third transition point 196. At third transition point 196 the contour of concave portion 194 changes from a concave wall to a tapered wall. Tapered portion 198 extends from third transition point 196 to second end 178. Tapered portion 198 can be tapered at 35° although this disclosure is not so limited.

Each of cylindrical portion 184, undulating portion 186, and tapered portion 198 can account for a different percentage of a total vertical height $H_1$ of bellow seal 142 as measured between first end 176 and second end 178. As a non-limiting example, cylindrical portion 184 can account for approximately thirty percent of the vertical height of bellow seal 142, undulating portion 186 can account for approximately fifty percent of the vertical height of bellow seal 142, and tapered portion 198 can account for approximately twenty percent of the vertical height of bellow seal 142. As a further non-limiting example, if bellow seal 142 includes flange 180, then the total vertical height of bellow seal 142 is measured from second end 178 to the top of flange 180. In this case, flange 180 can account for approximately eleven percent of the vertical height of bellow seal 142, cylindrical portion 184 can account for approximately twenty-two percent of the vertical height of bellow seal 142, undulating portion 186 can account for approximately fifty-two percent of the vertical height of bellow seal 142, and tapered portion 198 can account for approximately fifteen percent of the vertical height of bellow seal 142.

Cylindrical portion 184 has a diameter $d_4$. Convex portion 190 has a diameter $d_5$, and concave portion has a diameter $d_6$. Diameter $d_4$ is greater than diameters $d_5$ and $d_6$. Diameter $d_5$ is greater than diameter $d_6$. In one non-limiting embodiment of bellow seal 142, the ratio of diameter $d_5$ to diameter $d_6$ is approximately 2:1 although other proportions are contemplated.

External surface 182 also includes mid-points 200 and 202. Mid-points 200 and 202 are located on external surface 182 at a point that is tangential to a line parallel to a line connecting two transition points. More specifically, first mid-point 200 is located on external surface 182 at a point tangent to a line that is parallel to a line connecting first transition point 188 and second transition point 192. Second mid-point 202 is located on external surface 182 at a point tangent to a line that is parallel to a line connecting second transition point 192 and third transition point 196.

Flex region 204 is defined between first transition point 188 and second mid-point 202. As will be described in more detail below, flex region 204 is dynamic and flexes during operation of dispensing module 44. Regions on bellow seal 142 above first transition point 188 and below second mid-point 202 remain largely static during operation of dispensing module 44.

As shown in FIG. 5C, passage 206 is defined by internal surface 208 of bellow seal 142. Passage 206 extends from first end 176 to second end 178. Passage 206 includes inner bulbous cavity 210, which is disposed between upper bore 212 and lower bore 214. Inner bulbous cavity 210 has a diameter $d_7$, which is larger than a diameter of upper bore 212 or lower bore 214. With respect to external surface 182, part of inner bulbous cavity 210 is located within cylindrical portion 184 and a part of inner bulbous cavity 210 is located within convex portion 190.

In operation, bellow seal 142 is compressed when ball 100 of rod 164 is disengaged from outlet 48 as described above. Flex region 204 is the part of bellow seal 142 that is compressed. As flex region 204 is compressed, inner bulbous cavity 210 is also compressed. When ball 100 is engaged with outlet 48, bellow seal 142 is no longer compressed. As described above, bellow seal 142 facilitates movement of rod 164 while sealing first chamber 136 from second chamber 138.

There are several non-limiting reasons to use bellow seal 142. For example, the larger diameter of first end 176 as compared to second end 178 allows bellow seal 142 to have a more stable connection to body 72 during compression. This is because the load imparted to bellow seal 142 by the upward translation of rod 164 is able to be distributed over the larger surface area of first end 176. In contrast, if first end 176 has a diameter equal to that of second end 178, then the load imparted by the upward translation of rod 164 would not be distributed over a larger surface area. The load on any particular part of first end 176, is therefore less than it would be if the diameters of first end 176 and second end 178 were equal. This also results in first end 176 being more securely fastened to housing as the load imparted by rod 164 is less likely to cause first end 176 to slip out of position.

The larger diameter of first end 176 can also increase the sealing characteristics of bellow seal 142. This is because first end 176 can contact more of the interface between first chamber 136 and second chamber 138. Second end 178 needs to have a small diameter in order to fully engage rod 164 and to not restrict the access of the fluid to filter 94. If first end 176 had a diameter equal to that of second end 178, then less of the interface between first chamber 136 and second chamber 138 would be contacted by bellow seal 142. This could lead to decreased seal performance. Bellow seal 142 as designed however, provides increased contact area at the interface between first chamber 136 and second chamber 138, while maintaining a minimal diameter of second end 176 so as not to obstruct the flow of fluid in first chamber 136.

As another reason to use bellow seal 142, the geometry of bellow seal 142 allows the durability of bellow seal 142 to be easily increased. One way the durability of bellow seal 142 can be increased is by adjusting the vertical height of flex region 204. It has been found that bellow seal 142 life increases as the ratio of the vertical height of flex region 204 to the stroke length of rod 164 increases. This is because the increased length of flex region 204 is able to absorb the load imparted by the stroke of rod 164 better as length increases. As a non-limiting example, in one embodiment of dispensing module 44 the stroke length of rod 164 is set at 0.02 inches. The vertical length of flex region 204 is set at 0.16 inches, which yields a ratio of 8. Under these circumstances bellow seal 142 shows great improvement in durability. The ratio can be increased to a value greater than 8 to suit particular applications.

The vertical length of flex region 204 can be tuned in many ways. For example, the contour of external surface 182 can be altered such that first transition point 188 and second mid-point 202 are located close to each other or far apart. In this manner the flex region 204 vertical height to stroke length ratio can be tuned to suit any application. Thus, additional ratios of the flex region 204 vertical height to stroke length are contemplated.

The frustoconical shape of bellow seal 142 also allows the vertical height of flex region 204 to be tuned to be as high as necessary without taking up too much space in dispensing module 44. This is because first transition point 188 is near first end 176. The percentage of the vertical height of bellow seal 142 between first end 176 and first transition point 188 is, therefore, very small. Thus, the design of bellow seal 142 allows for a high flex height while still designing flex seal 142 to have as small of a profile as possible.

The location of bulbous cavity 210 can also impact the durability of bellow seal 142. That is, locating a part of bulbous cavity 210 within cylindrical portion 184 and another part of inner bulbous cavity 210 within convex portion 190 ensures that bulbous cavity is located along the thickest part of bellow seal 142. Therefore, as bellow seal 142 is cycled, the compression of bulbous cavity is absorbed by the thickest walls of bellow seal 142. Thus bellow seal is less likely to fail.

Although the present invention has been described with reference to preferred embodiments, workers skilled in the art will recognize that changes may be made in form and detail without departing from the spirit and scope of the invention.

The invention claimed is:

1. A bellow seal having a generally circular cross section, the bellow seal comprising:
   a first end having a first diameter;
   a second end having a second diameter smaller than the diameter of the first end;
   a contoured external surface extending between the first end and the second end, the external surface comprising:
      a cylindrical portion extending from the first end;
      an undulating portion comprising:
         a convex portion extending from the cylindrical portion; and
         a concave portion extending from the convex portion; and
      a tapered portion extending from the concave portion to the second end; and
   a flexible region defined between a first point located on the cylindrical portion and a second point located on the concave portion.

2. The bellow seal of claim 1, wherein the first point located on the cylindrical portion is defined as a first transition point where the cylindrical portion meets the convex portion.

3. The bellow seal of claim 1, wherein the second point located on the concave portion is defined as a mid-point located between a second transition point where the convex portion meets the concave portion and a third transition point where the concave portion meets the tapered portion.

4. The bellow seal of claim 1, and further comprising:
   a flange circumscribing the first end.

5. The bellow seal of claim 1, and further comprising:
   a passage defined by an internal surface of the seal and extending from the first end of the seal to the second end of the seal.

6. The bellow seal of claim 5, wherein the passage includes a bulbous cavity region defined by opposite sides of the internal surface.

7. The bellow seal of claim 6, wherein the bulbous cavity is located between the first point located on the cylindrical portion and the second point located on the concave portion.

8. The bellow seal of claim 1, wherein a cylindrical portion vertical height comprises about thirty percent of a bellow seal vertical height.

9. The bellow seal of claim 1, wherein an undulating portion vertical height comprises about fifty percent of a bellow seal vertical height.

10. The bellow seal of claim 1, wherein a tapered portion vertical height comprises about twenty percent of a bellow seal vertical height.

11. The bellow seal of claim 1, wherein the bellow seal is formed from a resilient material.

12. The bellow seal of claim 11, wherein the resilient material is selected from the group consisting of silicone and rubber.

13. The bellow seal of claim 1, wherein a ratio of a diameter of the bellow seal at the first point on the cylindrical portion to a diameter of the bellow seal at the second point on the concave portion is approximately 2:1.

14. A system for dispensing a fluid, the system comprising:
   a manifold configured to regulate a flow air and a flow of the fluid;
   a module for dispensing the fluid, the module comprising:
      a first chamber configured to receive the fluid;
      a bellow seal disposed within the first chamber, the bellow seal comprising:
         a cylindrical portion extending from a first end of the bellow seal and having a first diameter;
         a convex portion having a second diameter that is smaller than the first diameter and extending from the cylindrical portion;
         a concave portion extending from the convex portion;
         a tapered portion extending from the concave portion to a second end;

a flex region defined between a first point located on the cylindrical portion and a second point located on the concave portion; and a passage defined by an internal surface extending from the first end to the second end;

a second chamber configured to receive the flow of air;

a piston disposed within the second chamber and configured to move between a first position and a second position; and a rod secured to the piston, the rod extending through the bellow seal passage and configured to engage a fluid outlet port.

15. The system of claim 14, wherein the first point located on the cylindrical portion is defined as a first transition point where the cylindrical portion meets the convex portion.

16. The system of claim 14, wherein the second point located on the concave portion is defined as a mid-point located between a second transition point where the convex portion meets the concave portion and a third transition point where the concave portion meets the tapered portion.

17. The system of claim 14, wherein the bellow seal further comprises:

a flange fixed to a module housing.

18. The system of claim 14, wherein the rod further comprises:

a projection that is received by a recess in the bellow seal passage.

19. The system of claim 14, wherein the second end of the rod engages the fluid outlet port when the piston is in the first position and disengages the fluid outlet port when the piston is in the second position.

20. The system of claim 19, wherein a ratio of a vertical height of the flex region to a stroke length of the rod is equal to or greater than 8:1.

* * * * *